United States Patent [19]
Kikinis

[11] Patent Number: 5,797,036
[45] Date of Patent: Aug. 18, 1998

[54] APPARATUS WHICH PREPARES A MASTER MAP PORTRAYING LOCATION OF DEVICES RELATIVE TO BUS INTERFACE CIRCUITS AND COPYING THE PERTINENT PORTION OF THE MASTER MAP TO EACH BUS INTERFACE CIRCUITS

[75] Inventor: Dan Kikinis, Saratoga, Calif.

[73] Assignee: Elonex I.P. Holdings, Ltd., United Kingdom

[21] Appl. No.: 840,429

[22] Filed: Apr. 29, 1997

Related U.S. Application Data

[63] Continuation of Ser. No. 511,916, Aug. 7, 1995, abandoned, which is a continuation of Ser. No. 194,242, Feb. 10, 1994, abandoned.

[51] Int. Cl.$^6$ .................................................. G06F 13/00
[52] U.S. Cl. ........................ 395/858; 395/866; 395/856; 395/824; 395/829
[58] Field of Search ............................ 384/4; 380/25; 395/824, 856, 858, 829, 866

[56] References Cited

U.S. PATENT DOCUMENTS

| | | | |
|---|---|---|---|
| 3,996,564 | 12/1976 | Kerrigan et al. | 395/275 |
| 4,266,281 | 5/1981 | Struger et al. | 395/275 |
| 4,340,776 | 7/1982 | Ganz et al. | 178/3 |
| 4,396,984 | 8/1983 | Videki, II | 395/275 |
| 4,606,024 | 8/1986 | Glass et al. | 371/16 |
| 4,688,172 | 8/1987 | Wright | 364/200 |
| 4,697,232 | 9/1987 | Brunelle et al. | 395/275 |
| 4,905,233 | 2/1990 | Cain et al. | 370/94.1 |
| 4,974,151 | 11/1990 | Advani et al. | 395/700 |
| 5,014,193 | 5/1991 | Garner et al. | 364/200 |
| 5,130,983 | 7/1992 | Heffner, III | 370/85.8 |
| 5,146,565 | 9/1992 | Blanck et al. | 395/856 |
| 5,202,985 | 4/1993 | Goyal | 395/600 |
| 5,226,120 | 7/1993 | Brown et al. | 395/200 |
| 5,247,682 | 9/1993 | Kondou et al. | 395/700 |
| 5,260,999 | 11/1993 | Wyman | 384/4 |
| 5,274,631 | 12/1993 | Bhardwaj | 370/60 |
| 5,305,437 | 4/1994 | Fritze et al. | 395/162 |
| 5,315,657 | 5/1994 | Abadi et al. | 380/25 |
| 5,369,748 | 11/1994 | McFarland et al. | 395/306 |
| 5,539,881 | 7/1996 | Hunt et al. | 395/200.02 |
| 5,542,055 | 7/1996 | Amini et al. | 395/281 |

*Primary Examiner*—Thomas C. Lee
*Assistant Examiner*—Po C. Huang
*Attorney, Agent, or Firm*—Donald R. Boys

[57] ABSTRACT

An I/O control system for a general-purpose computer having multiple bus branches separated by routing circuitry prepares a digital map of I/O device locations on the bus branches, and copies versions of the maps to registers in the routing circuitry on startup and reset. The routing maps provide immediate routing information for I/O requests issued by one or more CPUs in a system, allowing the routing circuitry between bus branches to immediately route requests to the proper device with a minimum of wait states. In one aspect I/O devices are polled for location at startup and reset, and in another aspect, a universal map protocol is a part of the BIOS or storage accessible by the BIOS, making a system self-configuring and providing the necessary information for the mapping for the routing circuitry.

31 Claims, 12 Drawing Sheets

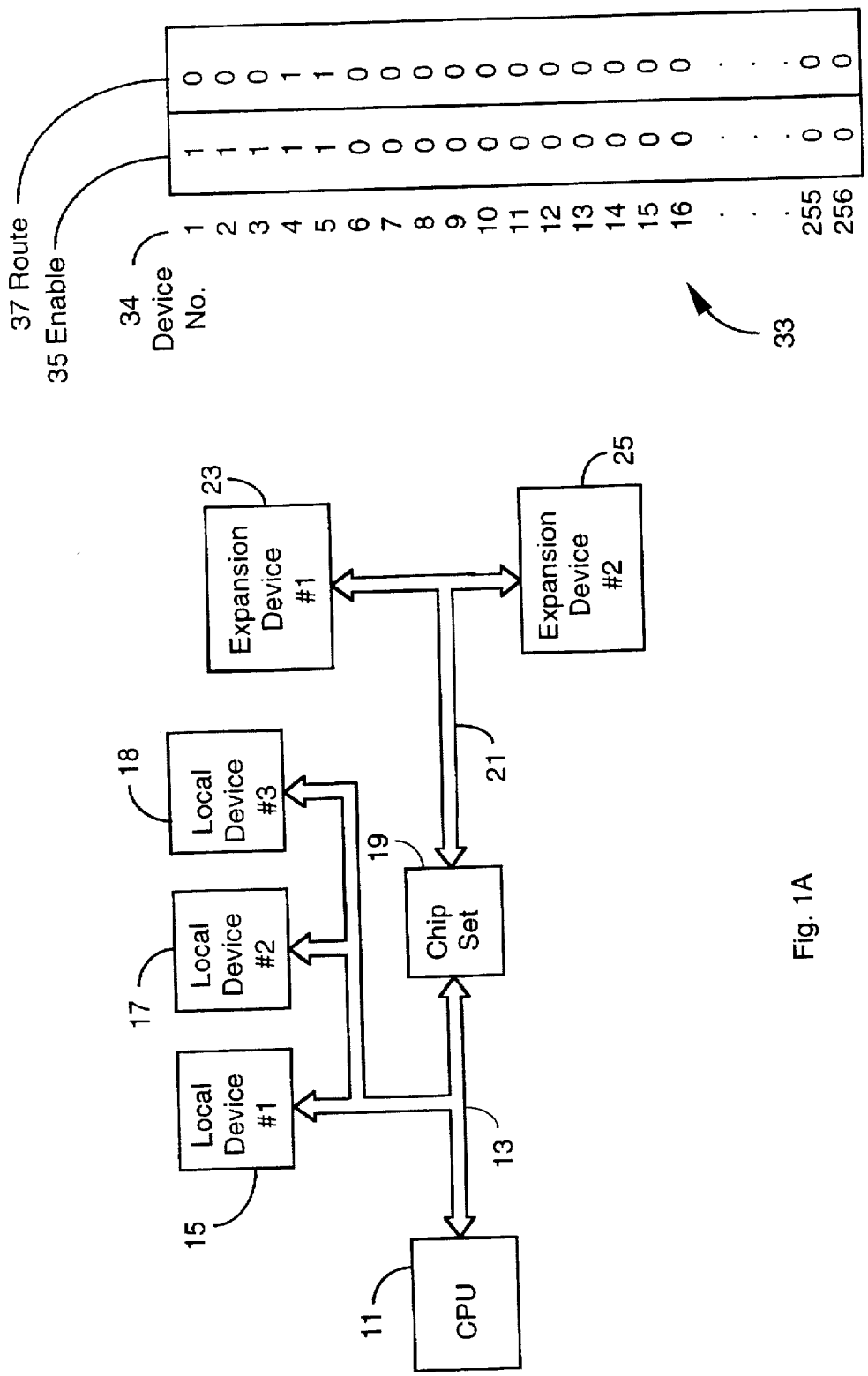

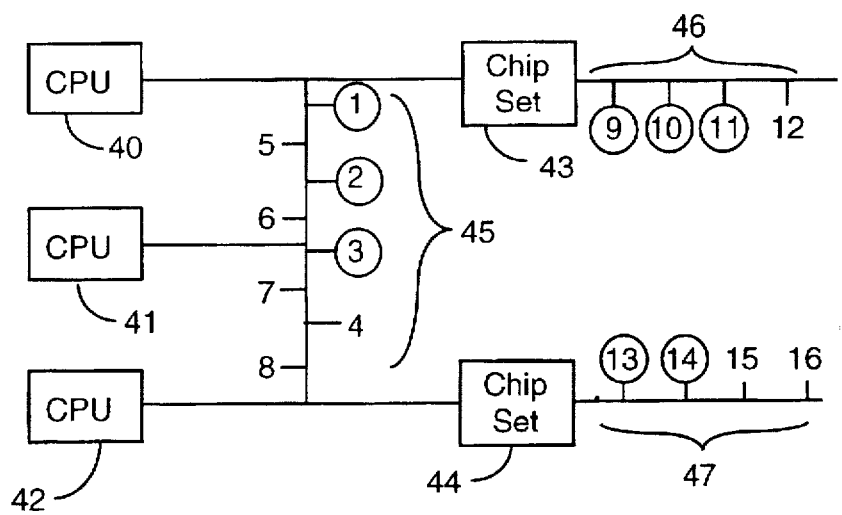
Fig. 2A
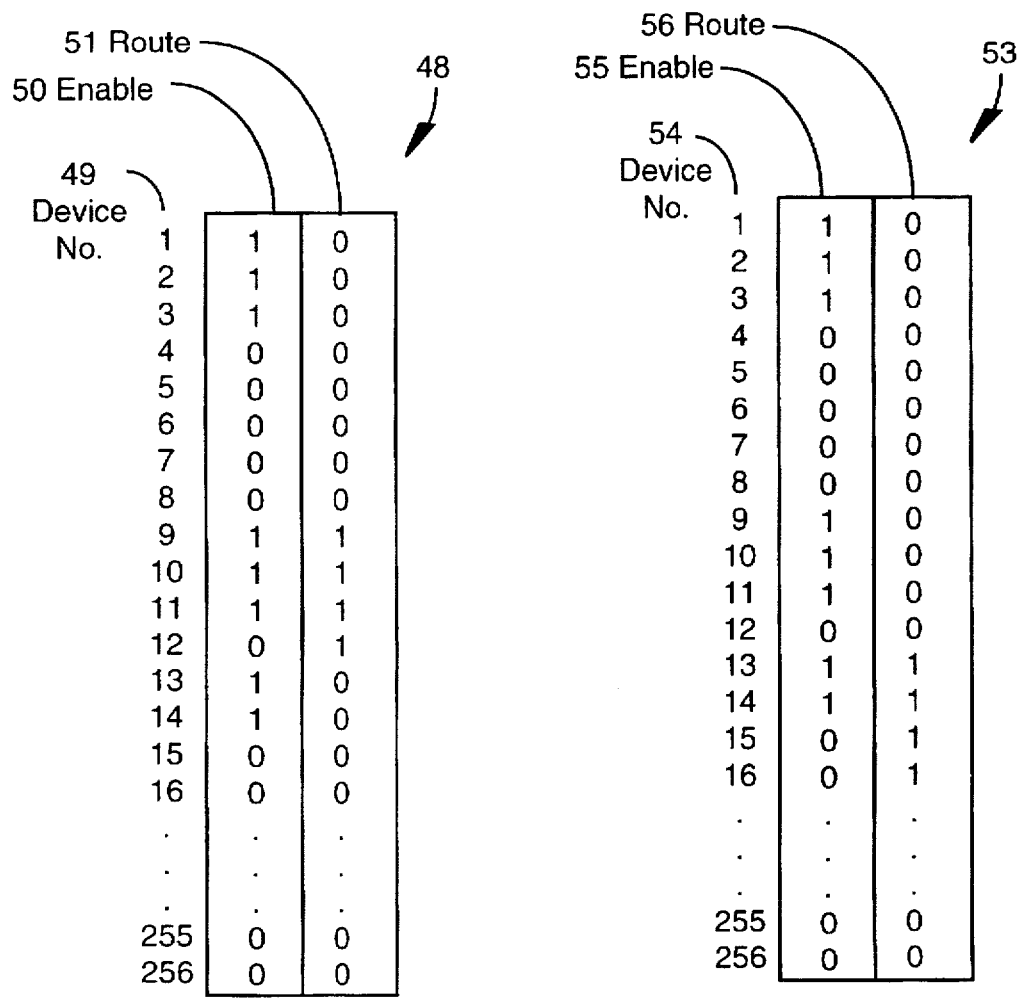
Fig. 2B
Fig. 2C

| Device | Enable | Route |
|---|---|---|
| 1 | 1 | 0 |
| 2 | 1 | 0 |
| 3 | 1 | 0 |
| 4 | 0 | 0 |
| 5 | 1 | 1 |
| 6 | 1 | 1 |
| 7 | 1 | 1 |
| 8 | 0 | 1 |
| 9 | 1 | 1 |
| 10 | 1 | 1 |
| 11 | 1 | 1 |
| 12 | 0 | 1 |
| 13 | 1 | 1 |
| 14 | 1 | 1 |
| 15 | 1 | 1 |
| 16 | 0 | 1 |
| . | . | . |
| . | . | . |
| . | . | . |
| 255 | 0 | 0 |
| 256 | 0 | 0 |

Fig. 3B

| Device | Enable | Route |
|---|---|---|
| 1 | 1 | 1 |
| 2 | 1 | 1 |
| 3 | 1 | 1 |
| 4 | 0 | 1 |
| 5 | 1 | 0 |
| 6 | 1 | 0 |
| 7 | 1 | 0 |
| 8 | 0 | 0 |
| 9 | 1 | 0 |
| 10 | 1 | 0 |
| 11 | 1 | 0 |
| 12 | 0 | 0 |
| 13 | 1 | 0 |
| 14 | 1 | 0 |
| 15 | 1 | 0 |
| 16 | 0 | 0 |
| . | . | . |
| . | . | . |
| . | . | . |
| 255 | 0 | |
| 256 | 0 | |

Fig. 3C

| Device | Enable | Route |
|---|---|---|
| 1 | 1 | 1 |
| 2 | 1 | 1 |
| 3 | 1 | 1 |
| 4 | 0 | 1 |
| 5 | 1 | 0 |
| 6 | 1 | 0 |
| 7 | 1 | 0 |
| 8 | 0 | 0 |
| 9 | 1 | 1 |
| 10 | 1 | 1 |
| 11 | 1 | 1 |
| 12 | 0 | 1 |
| 13 | 1 | 1 |
| 14 | 1 | 1 |
| 15 | 1 | 1 |
| 16 | 0 | 1 |
| . | . | . |
| . | . | . |
| . | . | . |
| 255 | 0 | 0 |
| 256 | 0 | 0 |

Fig. 3D

| Device | Enable | Route |
|---|---|---|
| 1 | 1 | 0 |
| 2 | 1 | 0 |
| 3 | 1 | 0 |
| 4 | 0 | 0 |
| 5 | 1 | 1 |
| 6 | 1 | 1 |
| 7 | 1 | 1 |
| 8 | 0 | 1 |
| 9 | 1 | 0 |
| 10 | 1 | 0 |
| 11 | 1 | 0 |
| 12 | 0 | 0 |
| 13 | 1 | 0 |
| 14 | 1 | 0 |
| 15 | 1 | 0 |
| 16 | 0 | 0 |
| . | . | . |
| . | . | . |
| . | . | . |
| 255 | 0 | |
| 256 | 0 | |

Fig. 3E

| Device | Enable | Route |
|---|---|---|
| 1 | 1 | 1 |
| 2 | 1 | 1 |
| 3 | 1 | 1 |
| 4 | 0 | 1 |
| 5 | 1 | 1 |
| 6 | 1 | 1 |
| 7 | 1 | 1 |
| 8 | 0 | 1 |
| 9 | 1 | 0 |
| 10 | 1 | 0 |
| 11 | 1 | 0 |
| 12 | 0 | 0 |
| 13 | 1 | 1 |
| 14 | 1 | 1 |
| 15 | 1 | 1 |
| 16 | 0 | 1 |
| . | . | . |
| . | . | . |
| . | . | . |
| 255 | 0 | 0 |
| 256 | 0 | 0 |

Fig. 3F

| Device | Enable | Route |
|---|---|---|
| 1 | 1 | 0 |
| 2 | 1 | 0 |
| 3 | 1 | 0 |
| 4 | 0 | 0 |
| 5 | 1 | 0 |
| 6 | 1 | 0 |
| 7 | 1 | 0 |
| 8 | 0 | 0 |
| 9 | 1 | 1 |
| 10 | 1 | 1 |
| 11 | 1 | 1 |
| 12 | 0 | 1 |
| 13 | 1 | 0 |
| 14 | 1 | 0 |
| 15 | 1 | 0 |
| 16 | 0 | 0 |
| . | . | . |
| . | . | . |
| . | . | . |
| 255 | 0 | 0 |
| 256 | 0 | 0 |

Fig. 3G

| Device | Enable | Route |
|---|---|---|
| 1 | 1 | 1 |
| 2 | 1 | 1 |
| 3 | 1 | 1 |
| 4 | 0 | 1 |
| 5 | 1 | 1 |
| 6 | 1 | 1 |
| 7 | 1 | 1 |
| 8 | 0 | 1 |
| 9 | 1 | 1 |
| 10 | 1 | 1 |
| 11 | 1 | 1 |
| 12 | 0 | 1 |
| 13 | 1 | 0 |
| 14 | 1 | 0 |
| 15 | 1 | 0 |
| 16 | 0 | 0 |
| . | . | . |
| . | . | . |
| . | . | . |
| 255 | 0 | 0 |
| 256 | 0 | 0 |

Fig. 3H

| Device | Enable | Route |
|---|---|---|
| 1 | 1 | 0 |
| 2 | 1 | 0 |
| 3 | 1 | 0 |
| 4 | 0 | 0 |
| 5 | 1 | 0 |
| 6 | 1 | 0 |
| 7 | 1 | 0 |
| 8 | 0 | 0 |
| 9 | 1 | 0 |
| 10 | 1 | 0 |
| 11 | 1 | 0 |
| 12 | 0 | 0 |
| 13 | 1 | 1 |
| 14 | 1 | 1 |
| 15 | 1 | 1 |
| 16 | 0 | 1 |
| . | . | . |
| . | . | . |
| . | . | . |
| 255 | 0 | |
| 256 | 0 | |

Fig. 3I

| Device No. | 141 Enable (143) | 145 | 147 | |
|---|---|---|---|---|
| 1 | 1 | 0 | 0 | 0 |
| 2 | 1 | 0 | 0 | 0 |
| 3 | 1 | 0 | 0 | 0 |
| 4 | 0 | 0 | 0 | 0 |
| 5 | 1 | 1 | 0 | 0 |
| 6 | 1 | 1 | 0 | 0 |
| 7 | 1 | 1 | 0 | 0 |
| 8 | 0 | 1 | 0 | 0 |
| 9 | 1 | 0 | 1 | 0 |
| 10 | 1 | 0 | 1 | 0 |
| 11 | 1 | 0 | 1 | 0 |
| 12 | 0 | 0 | 1 | 0 |
| 13 | 1 | 0 | 0 | 1 |
| 14 | 1 | 0 | 0 | 1 |
| 15 | 1 | 0 | 0 | 1 |
| 16 | 0 | 0 | 0 | 1 |
| . | . | . | . | . |
| . | . | . | . | . |
| . | . | . | . | . |
| 255 | 0 | 0 | 0 | 0 |
| 256 | 0 | 0 | 0 | 0 |

Fig. 4B

| Device No. | Enable (191) | 193 | 195 | (unlabeled) |
|---|---|---|---|---|
| 1 | 1 | 0 | 0 | 0 |
| 2 | 1 | 0 | 0 | 0 |
| 3 | 1 | 0 | 0 | 0 |
| 4 | 0 | 0 | 0 | 0 |
| 5 | 1 | 1 | 0 | 0 |
| 6 | 1 | 1 | 0 | 0 |
| 7 | 1 | 1 | 0 | 0 |
| 8 | 0 | 1 | 0 | 0 |
| 9 | 1 | 0 | 1 | 0 |
| 10 | 1 | 0 | 1 | 0 |
| 11 | 1 | 0 | 1 | 0 |
| 12 | 0 | 0 | 1 | 0 |
| 13 | 1 | 0 | 0 | 1 |
| 14 | 1 | 0 | 0 | 1 |
| 15 | 1 | 0 | 0 | 1 |
| 16 | 0 | 0 | 0 | 1 |
| . | . | . | . | . |
| 255 | 0 | 0 | 0 | 0 |
| 256 | 0 | 0 | 0 | 0 |

Fig. 5B

APPARATUS WHICH PREPARES A MASTER MAP PORTRAYING LOCATION OF DEVICES RELATIVE TO BUS INTERFACE CIRCUITS AND COPYING THE PERTINENT PORTION OF THE MASTER MAP TO EACH BUS INTERFACE CIRCUITS

This is a continuation of application Ser. No. 08/511,916 filed Aug. 8, 1995 now abandoned which is a continuation of application Ser. No. 08/194,242 filed Feb. 10, 1994, now abandoned.

FIELD OF THE INVENTION

This invention is in the field of methods and apparatus for bus management in computer systems.

BACKGROUND OF THE INVENTION

An ability to communicate rapidly through bus architecture is a critical factor in personal computer performance. Early buses designed for IBM PC and XT computers were coupled directly to the CPU and operated in time with the CPU clock. Development of faster CPUs, however, such as with the inception of the IBM PC AT computer, increased CPU clock speed beyond the capabilities of most expansion devices. This led AT developers to design a system wherein the CPU and the bus ran with separate clocks at different speeds.

AT bus design proved so satisfactory that its structure became Industry Standard Architecture (ISA). Such a dual-speed configuration is common today, as most computers operate with slower buses and comply with conventional standards such as Extended Industry Standard Architecture (EISA) and Micro Channel Architecture (MCA).

In a quest for better performance from expansion devices, manufacturers have more recently refocused on bus architecture. Current state-of-the-art systems typically use a high-speed local bus for devices that have high data transfer rate capability, such as video adapters, hard drives, memory controllers, and network connections, and a slower expansion bus for devices that do not require or cannot operate at the higher rates.

In theory, a 32-bit local bus should be capable of transferring data as much as six times faster than an EISA or ISA bus, but most attempts at high-speed local bus implementation have had less than expected results. The first enhanced local bus products, dedicated solely to video systems, demonstrated only about 30 percent faster performance than an EISA or MCA expansion bus. Although part of the problem was found to be specific to video power and time requirements, the need for improvement was apparent. Since then, several local bus standards have been developed and local buses are currently operable at clock cycle rates at or above 33 MHz.

A problem that still impedes optimum performance in bus management is the number of wait states that occur before a CPU can locate a peripheral device on the bus. Because a CPU typically has no way of knowing the port assignment of a peripheral device, the CPU must transmit an address request to find the device on the bus. In many cases there will be more than one branch of a local bus, because the ability of a conventional CPU to simultaneously drive several loads is limited. Branches are separated by chip sets, which comprise solid state circuitry for buffering and routing addresses and data from branch to branch. Each time buffering occurs, wait states have to be added and operation is slowed.

If, after a request is made, the addressed device does not respond within a certain period of time, the CPU goes on to try to find the device at another address. Each time a device is not at an address, the CPU adds wait states.

What is needed is a means to decrease wait states by giving a CPU immediate access to device addresses on a bus architecture. Such a bus system might also be self-configuring so a user can plug a device into any slot and immediately use it.

SUMMARY OF THE INVENTION

In an embodiment of the invention, a method for routing requests by I/O devices is provided for use with a computer having a bus structure with branches separated by sets of routing circuitry (typically chip sets for branching bus architecture). The method comprises steps of (a) preparing a digital map on startup and reset for portraying the location of the devices on the branches of the bus structure; (b) copying versions of the digital map to registers in the sets of routing circuitry, each map version being particular to the set of routing circuitry for which it is prepared; and (c) routing requests by I/O devices at each set of routing circuitry according to the digital map copied to that set of routing circuitry.

In one aspect of the invention, the information needed for composing the digital maps is obtained by polling the bus structure I/O devices on startup and reset to ascertain the location of installed devices on the bus branches. In another aspect, each I/O port available in a system configuration is assigned a universal configuration port number, providing a universal map protocol stored in a nonvolatile memory device, and the universal map protocol is read by the system BIOS on startup and reset to prepare the digital map.

Typical maps according to embodiments of the invention for copying to chip sets comprise a row assigned to each I/O device, a bit column indicating I/O devices installed and enabled, and one or more bit columns indicating the branch connected to the routing circuitry associated with the map for routing received I/O requests. For chip sets having two bus ports, the map typically has just two bit columns.

Polling, map preparation, and the like are controlled in one embodiment by control routines that are a part of the system BIOS. In an alternative embodiment, the control routines may be a part of a separate nonvolatile storage accessible by the BIOS on start up and reset. In yet another embodiment an interactive display may be provided for a user to enter port assignments on bus branches for installed I/O devices, the port assignments then being stored and used for preparing the digital map.

BRIEF DESCRIPTION OF THE DRAWINGS

FIG. 1A is a block diagram of a local bus structure in combination with an I/O expansion bus according to an embodiment of the present invention.

FIG. 1B is an illustration of a bus decoder map according to the embodiment of FIG. 1A.

FIG. 2A is a block diagram of a bus structure shared by multiple CPUs in a variation of the embodiment shown in FIG. 1A.

FIG. 2B is an illustration of a bus decoder map for the first chip set according to the embodiment of FIG. 2A.

FIG. 2C is an illustration of a bus decoder map for the second chip set according to the embodiment of FIG. 2A.

FIG. 3B shows a decoder map for one of the chip set ports according to the embodiment of FIG. 3A.

FIG. 3C shows a decoder map for another of the chip set ports according to the embodiment of FIG. 3A.

FIG. 3D shows a decoder map for another of the chip set ports according to the embodiment of FIG. 3A.

FIG. 3E shows a decoder map for another of the chip set ports according to the embodiment of FIG. 3A.

FIG. 3F shows a decoder map for another of the chip set ports according to the embodiment of FIG. 3A.

FIG. 3G shows a decoder map for another of the chip set ports according to the embodiment of FIG. 3A.

FIG. 3H shows a decoder map for another of the chip set ports according to the embodiment of FIG. 3A.

FIG. 3I shows a decoder map for another of the chip set ports according to the embodiment of FIG. 3A.

FIG. 4B is an illustration of a decoder map for one port of the chip set of FIG. 4A.

FIG. 5B is an illustration of a decoder map for the embodiment of FIG. 5A.

DESCRIPTION OF THE PREFERRED EMBODIMENTS

Figure 3A:
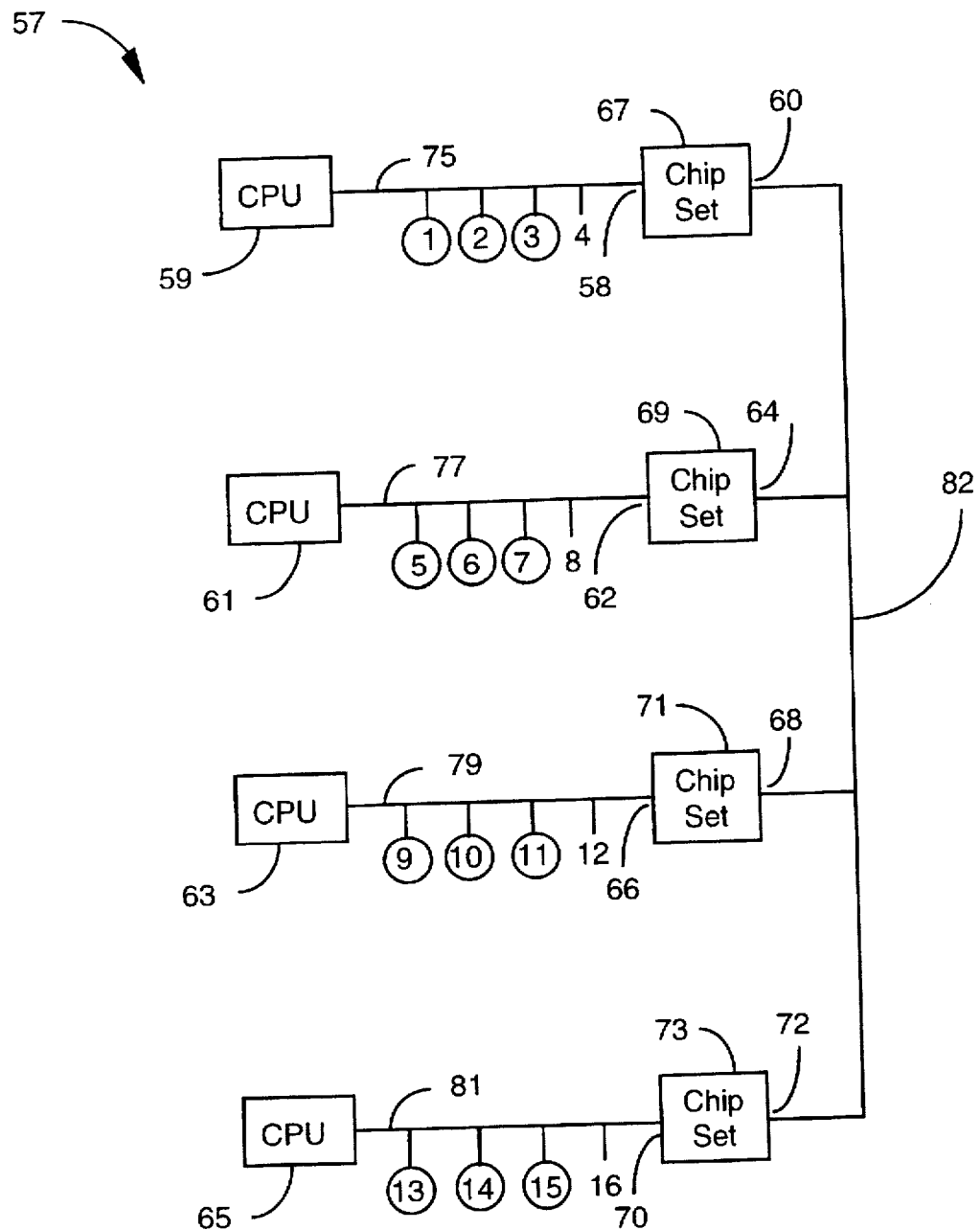
FIG. 3A is a block diagram of a multiple-CPU bus structure in another embodiment of the invention.

FIG. 1A is a block diagram for a bus architecture comprising a local bus structure 13 in combination with an I/O expansion bus 21 according to an embodiment of the present invention. CPU 11 is connected through local bus 13 to chip set 19 and to local devices 15, 17, and 18. Chip set 19 is connected through I/O expansion bus 21 to I/O devices 23 and 25.

In this embodiment of the invention, a control routine, which may reside in BIOS or may be accessed by BIOS from another source, polls all devices at startup and reset and sets up a decoder map in system RAM (not shown) or other memory area for testing. Once tested, the decoder map is copied into registers (not shown) in chip set 19. When CPU 11 initiates communication with a device, chip set 19 immediately identifies address and routing information from the decoder map and routes the request in one wait state. There are no extra wait states as there would be if the CPU had to search for the device address.

FIG. 1B is a diagram of a bus decoder map 33 for chip set 19 of FIG. 1A. Decoder map 33 has a maximum address range 34 in this embodiment of 1–256. There could be more or fewer addresses in the range in other embodiments. Addresses 1 through 3 store routing information for local devices 15, 17, and 18, respectively (FIG. 1A), addresses 4 and 5 store routing information for devices 23 and 25. Column 35 stores a bit denoting an enabled device. The bit in column 35 is arbitrarily set as 1 if a port is enabled, or to 0 if a port is not enabled. The designation could as well be opposite. Second bit 37 is arbitrarily set to 0 if the device referenced is on one side of chip set 19 (on the local bus, for example), or 1 if the device is on the other side (in this case on expansion bus 21). This convention is arbitrary and could be reversed, as well.

Because in this example only a single local bus with no branching exists, all second bits 37 for addresses 1 through 3 are set the same. Devices 23 and 25 on the expansion bus are represented in the map of FIG. 1B as number 4 and 5, where the enable bit is 1 and the routing bit is also 1, indicating these devices are on the opposite side of chip set 19 from devices 15, 17, and 18. The convention here, assuming a chip set with two bus ports, one to the local bus and one to the expansion bus, is to indicate with the routing bit that the device is either on the local bus side or on the expansion bus side.

In the embodiment of FIG. 1A, at startup or reset, as indicated above, devices are polled, a routing map is prepared and tested, and the map is copied to available registers of chip set 19. Thereafter, the chip set acts as a bridge, switching appropriately when necessary to route requests generated by CPU 11 to far side expansion bus 21 or to near side local bus 13.

The performance improvement in the case of the architecture of FIG. 1A is real, but somewhat marginal, because of the inherent simplicity of the bus architecture. In more sophisticated bus architectures, particularly in architectures having branched, high-speed, local buses, the performance improvement is much greater.

FIG. 2A is a block diagram of a branched bus configuration, wherein three CPUs 40, 41, and 42 share primary bus branch 45 and two secondary bus branches 46 and 47. In this configuration CPUs 40, 41, and 42 are connected to two chip sets 43 and 44. In this embodiment, on startup and reset, decoder maps developed by polling are loaded to each of chip sets 43 and 44, providing complete routing information for all bus branches.

In this example, primary bus branch 45 has 8 device slots with addresses 1 to 8; secondary bus branches 46 and 47 have four device slots each with addresses 9 to 12 and 13 to 16, respectively. Slots having enabled devices installed are circled on the diagram.

In this embodiment, if CPU 42 addresses device 10 on bus branch 46, a request is quickly routed to device 10 through chip set 43 by virtue of the decoder maps being stored in both chip sets 43 and 44. Only one wait state is expended instead of the three wait states or more it would take for a conventional bus configuration to go to both chip sets to search the different bus branches for the device.

FIGS. 2B and 2C are illustrations of decoder maps 48 and 53 for chip sets 43 and 44, respectively, of FIG. 2A. Both of these decoder maps have maximum address ranges 49 and 54 of 1–256. The bit in columns 50 and 55 is the enable bit and the bit in columns 51 and 56 is the routing bit. Criteria for setting these two bits is the same as that described for the decoder map in FIG. 1B. For example, map 48 for chip set 43 has a "1" in enable column 50 for all the circled devices, and a "1" in routing column 51 for devices 9, 10, and 11, which are on the expansion bus side of chip set 43.

FIG. 3A is a block diagram 57 of another variation of a bus configuration, wherein four CPUs 59, 61, 63, and 65 are associated with four chip sets 67, 69, 71, and 73. There are five bus segments 75, 77, 79, 81, and 82, which communicate with the chip sets at ports 58, 60, 62, 64, 66, 68, 70, and 72. Each of bus branches 75, 77, 79, and 81 have four device positions. Positions with enabled devices installed are shown circled. In this embodiment the routing maps for each chip set will still be two-dimensional, having one bit for enable and another for routing. There will be, however, an additional complication.

Consider a request by CPU 59 for device 14. This request intercepted at port 58 needs a map that directs all requests for other than devices 1, 2, and 3 to bus branch 82. This is not sufficient, however, because once the request is on branch 82, it needs to be directed at ports 64, 68, and 72. As a result every port on the chip sets (in this case) needs a map. There will therefore be two maps in each chip set: one for each bus port.

FIGS. 3B, 3C, 3D, 3E, 3F, 3G, 3H, and 3I are two-dimensional decoder maps for ports 58, 60, 62, 64, 66, 68, 70, and 72, respectively. For the eight two-dimensional maps in this embodiment, the bits in the enable column for the installed and enabled devices (circled in FIG. 3A) will be the same. The bit for the route column for each two-dimensional map will reflect whether the device sought is on the port side or the opposite side from the port associated with the particular map.

There are alternatives to the two-dimensional maps, port by port, described above for the embodiment of FIG. 3A. There could be a single map for each chip set, for example, with a routing column for each branch having installed devices. In this case, the routing circuitry at each chip set would be configured to switch appropriately in response to a 1 bit in a routing column for an installed device.

Figure 4A:
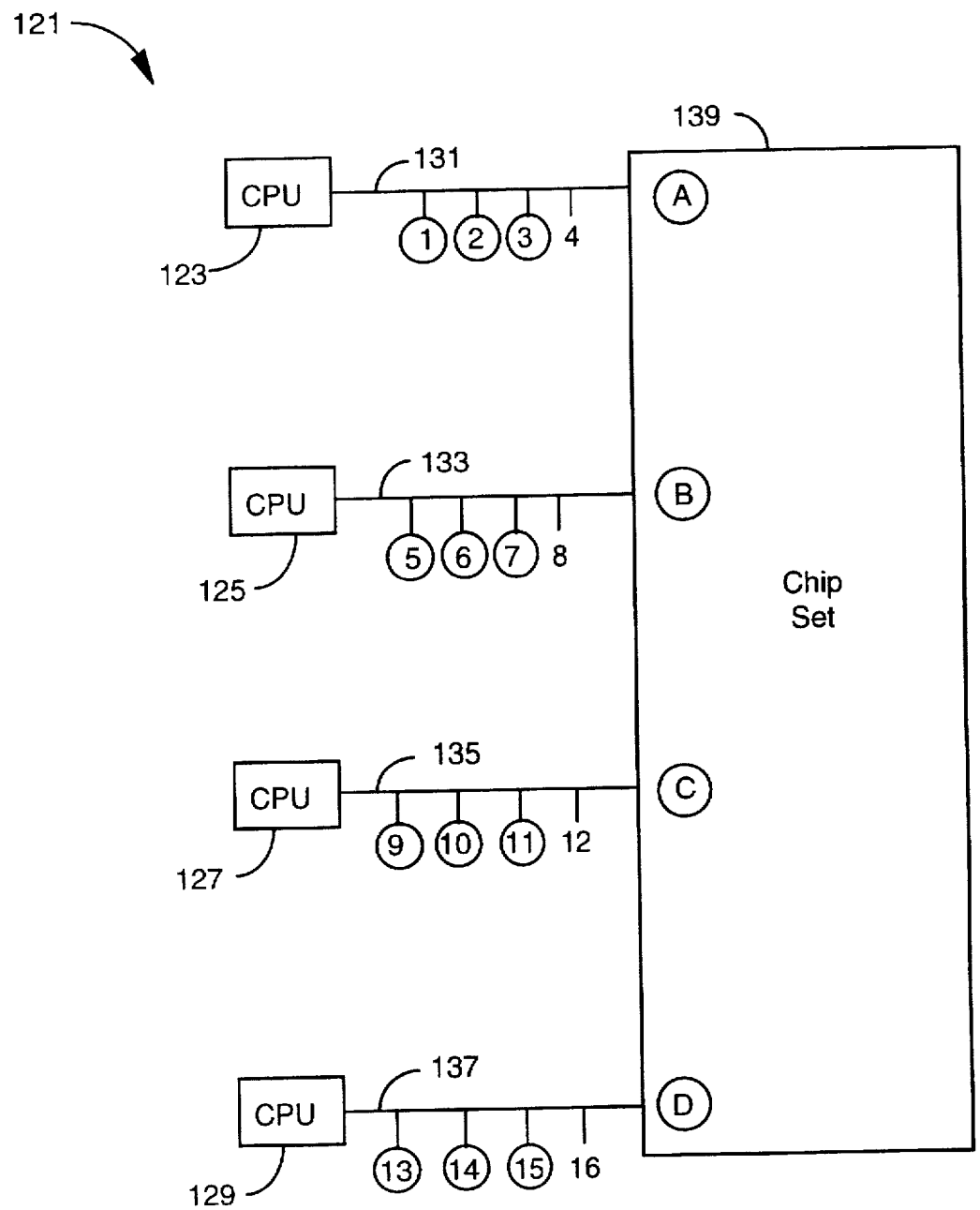
FIG. 4A is a block diagram for a bus structure having multiple CPUs connected to a single chip set.

FIG. 4A illustrates a system 121 having four branches of a bus structure, four CPUs, and one chip set. CPU 123 connects to chip set 139 through branch 131, CPU 125 connects to chip set 139 through branch 133, CPU 127 connects to chip set 139 through branch 135, and CPU 129 connects to chip set 139 through branch 137. There are three enabled devices (1), (2), and (3) on branch 131, three enabled devices (5), (6), and (7) on branch 133, three enabled devices (9), (10), and (11) on branch 135, and three enabled devices (13), (14), and (15) on branch 137.

In the embodiment of FIG. 4A, the chip set has four ports, labeled (A), (B), (C), and (D). The chip set, then, assuming all the bus branches have one or more enabled devices installed, must route requests from any one CPU to three alternative destinations.

In this embodiment, there are four maps, one for each port. Each map has an enable column and three routing columns. FIG. 4B shows the map for port (A) of FIG. 4A. Devices 1–3, 5–7, 9–11, and 13–15 are enabled, so the bit for enable column 141 is 1 for these devices. This will be common for the four maps.

For port (A), devices 1, 2, and 3 are CPU direct, so routing columns 143, 145, and 147 are all zero for these devices. Arbitrarily, a 1 bit is assigned to one of the three routing columns to indicate each of the three "other" branches for port (A). In this case column 143 is assigned for branch 133, column 145 for branch 135, and column 147 for branch 137. A 1 bit in a column indicates the device in that row is enabled on that bus branch. So for device 10, for example, in the map for port (A), column 145 has a 1 bit and columns 143 and 147 are zero.

Given the example of FIG. 4B, the maps for the other ports are intuitive and are not reproduced here.

There are a number of other ways mapping may be accomplished for the example of FIG. 4A. There could be, for example, one map, and logic could be provided so the entry port for a request for a device would rearrange the map to suit the port. In general, there needs to be a map, or a perturbation of the map, for each CPU port, and the routing columns need to combine the bits in a unique fashion to indicate the branch for routing depending on the enabled device. Having a unique bit for each "other" port is one way. A map could also have a unique routing column for each of the four ports. Another solution is to take advantage of the minimum number of unique bit patterns to indicate routing. In this solution two columns may indicate four branches. 00 is CPU side, 01 is one alternative branch, 10 is another, and 11 is the third alternative branch, for four total. Three bits may then indicate eight branches, and so on.

Figure 5A:
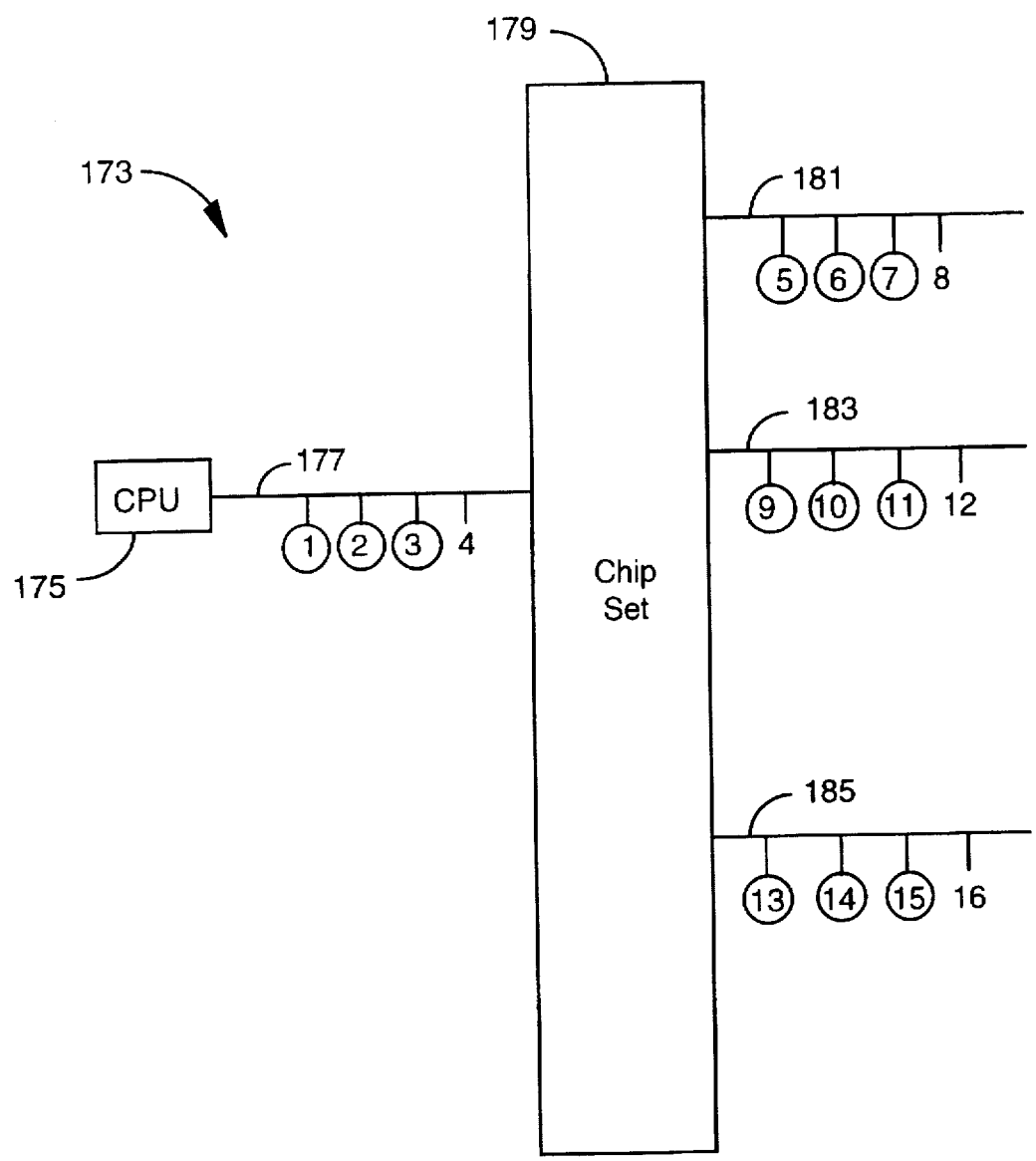
FIG. 5A is a block diagram of a bus structure having a single CPU connected to a single chip set with multiple bus branches.

FIG. 5A is a block diagram of a system 173 having a single CPU 175, a single chip set 179, and four bus branches 177, 181, 183, and 185, one of which (177) is the CPU branch. FIG. 5B shows a routing map for this case, having three routing columns 191, 193, and 195. As described above for the map for the embodiment of FIG. 4A, for all above routing columns 0 means the device requested is on the CPU branch. A 1 bit in column 191 routes requests by CPU 175 to branch 181; a 1 bit in column 193 routes requests to branch 183, and a 1 bit in column 195 routes requests to branch 185.

As described above for the embodiment of FIG. 4A, there are several alternatives for the map shown for the embodiment of FIG. 5A. There could be four routing columns, for example, one for each branch, or the columns could be used as bit patterns to indicate routing.

In an alternative embodiment, a system having a bus structure such as that described above for FIG. 1A, FIG. 2A, FIG. 3A, FIG. 4A, FIG. 5A, or other branching structure not shown, may be self-configuring. That is, instead of BIOS having to poll devices at setup, each type of device on the bus is preassigned a universal configuration port number through a programmable I/O map protocol. This protocol can be stored in a Complementary Metal Oxide Semiconductor (CMOS), Erasable Programmable Read-Only Memory (EPROM), or other suitable type of memory chip, and is accessed by BIOS on startup to initialize the bus decoder map. With this innovation a user can install a device in any location on a branched bus structure and use the device immediately without need to set up a port assignment.

In another embodiment, a bus structure such as that described for FIG. 1A, FIG. 2A, FIG. 3A, FIG. 4A, FIG. 5A, or other variation, can be configured by a user through a control routine that provides a means to select device assignments from an on-screen menu interface, and the assignments will be copied to a permanent memory area that is accessed by BIOS at startup.

Figure 6:
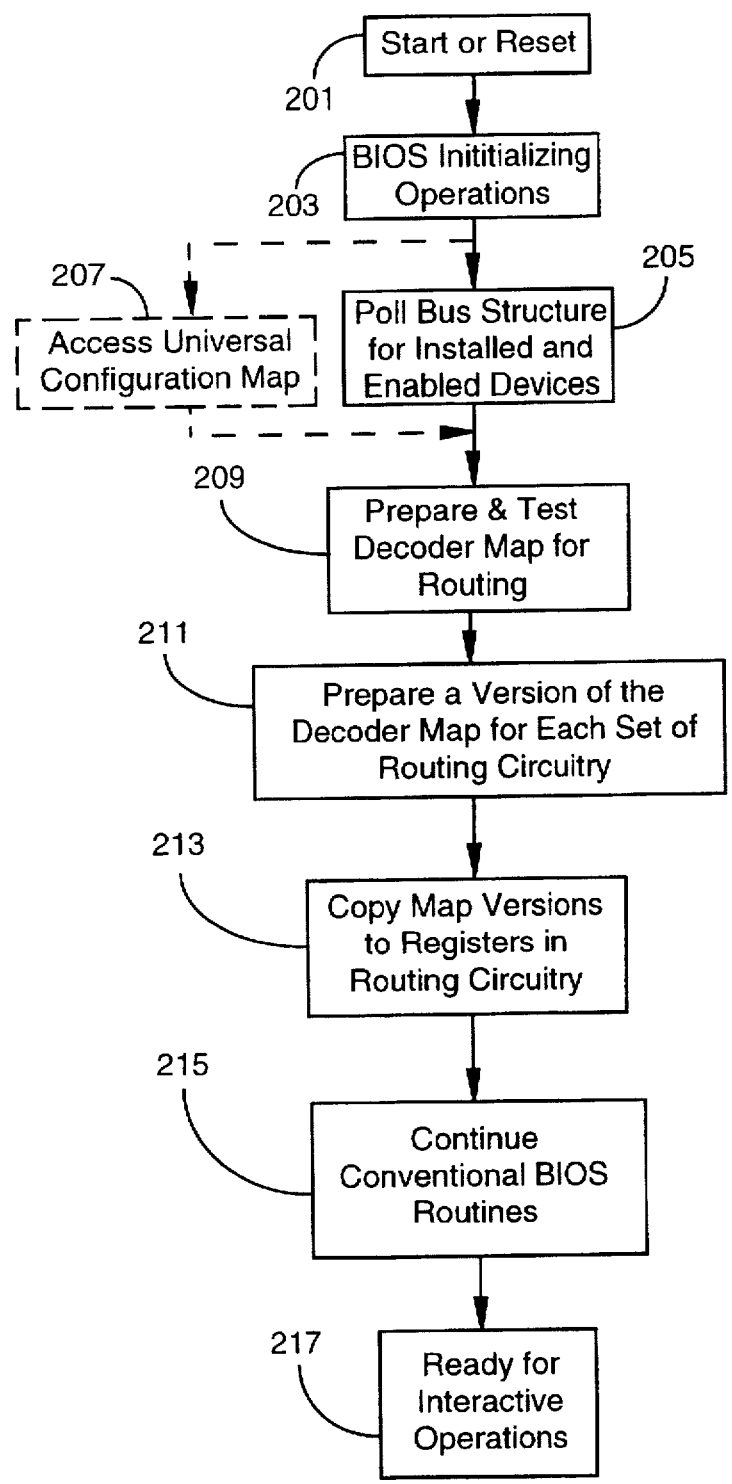
FIG. 6 is a logic flow diagram illustrating steps in developing and using decoder maps according to an embodiment of the invention.

FIG. 6 is a logic flow diagram showing steps involved in an embodiment of the present invention for initializing a decoder map and providing the map to routing circuitry in a branched bus structure. At step 201 a signal is received for startup or reset of a computer system configured according to the invention. Initially, conventional BIOS routines execute, for such as memory initialization and the like, and these activities are represented as step(s) 203.

At some point, routines execute in the BIOS (or, in an alternative case, are accessed by the BIOS and execute), for the map initialization as described in several embodiments above. In one embodiment the bus structure is polled to locate installed and enabled devices, and the devices are assigned a number and location for a map. This polling step is indicated in FIG. 6 as step 205. Alternatively, the BIOS may access a universal map protocol for the information, represented by alternative step 207 shown in dotted outline with dotted flow path.

Once the necessary information is obtained, a map is prepared and tested at step 209. In this step, a copy of the map may be stored in system RAM, or other system memory. At step 211 versions of the decoder map are prepared for the routing circuitry separating bus branches in the system. At step 213, the map versions are copied to the appropriate routing circuitry. This circuitry is typically implemented in solid state in one or more chips, and is typically referred to as a chip set.

Step 215 indicates continuation of BIOS functions after the map preparation, according to embodiments of the invention, is complete. At some point, indicated by step 217, initialization is complete, and the system is ready to begin interactive operations, typically involving loading a specific application, such as a word processing application. During operation, requests for bus devices will be routed by various chip sets separating buses and bus branches according to the decoder maps prepared and copied to the chip sets.

It will be apparent to one with skill in the art that there are a relatively large number of changes that may be made in the embodiments described above without departing from the spirit and scope of the invention. Other variations might enhance bus performance by incorporating other currently available optimization features into the architecture. Many other alternatives can fall within the scope and spirit of the invention.

What is claimed is:

1. In a computer system having three or more separate buses connected by bus interface circuits, a method for routing requests for devices connected to the separate buses, comprising steps of:
   (a) preparing a digital master map which portrays the location relative to the bus interface circuits of each connected device;
   (b) determining the portion of the master map pertinent to each bus interface circuit according to the buses connected by each interface circuit;
   (c) copying the portion of the digital master map pertinent to each interface circuit to the associated bus interface circuit; and
   (d) routing requests for connected devices at the bus interface circuits according to the map portions copied to the associated bus interface circuits.

2. The method of claim 1, wherein the step of preparing the digital map further comprises steps of:
   polling connected devices to ascertain the location of installed devices on said separate buses, and
   using the results of the polling step to prepare said digital map.

3. The method of claim 1, wherein the step of preparing the digital map further comprises steps of:
   assigning each I/O port available in a system configuration a universal configuration port number;
   storing a universal map protocol in a nonvolatile memory device; and
   reading the universal map protocol by a system Basic Input Output System (BIOS) to prepare the digital map.

4. The method of claim 1 wherein the step of preparing the digital map further comprises steps of:
   assigning a row of a memory array to each connected device;
   enabling a bit in a first column of the memory array to indicate that the connected device assigned to the row of the enabled bit is installed and enabled; and
   enabling bits in one or more additional columns of the memory array to indicate the location of each connected device relative to each bus interface circuit.

5. The method of claim 1 wherein a bus interface circuit has a first port and a second port, and the routing step further comprises steps of:

arranging the map portion copied to the bus interface circuit in a plurality of rows and a column, wherein each row corresponds to a connected device;
routing a request for a connected device from the first port to the second port if the map portion copied to the bus interface circuit has a first digital value in the column of the row corresponding to the requested connected device; and
blocking a request for a connected device from the first port to the second port if the map portion copied to the bus interface circuit has a second digital value, opposite the first digital value, in the column of the row corresponding to the requested connected device.

6. The method of claim 1 wherein a bus interface circuit has an input port and a plurality of output ports, and the routing step further comprises steps of:
   arranging the map portion copied to the bus interface circuit in a plurality of rows and a plurality of columns, wherein each row corresponds to a connected device, and each column corresponds to one of the output ports;
   routing a request for a connected device from the input port to an output port if the map portion copied to the bus interface circuit has a first digital value in the column corresponding to the output port in the row corresponding to the requested connected device; and
   blocking a request for a connected device from the first port to an output port if the map portion copied to the bus interface circuit has a second digital value, opposite the first digital value, in each column of the row corresponding to the requested connected device.

7. The method of claim 1, wherein the step of preparing a digital map further comprises the steps of:
   providing the computer system with a display having an interactive, on-screen interface;
   entering the locations of installed connected devices on said buses using the on-screen interface; and
   using the locations entered by the on-screen interface to prepare the digital map.

8. The method of claim 1, wherein the step of preparing the digital map is performed during startup and reset of the computer system.

9. The method of claim 1, further comprising, before the step of preparing a digital map, a step of establishing operation of the computer system.

10. The method of claim 1, wherein the step of preparing a digital map further comprises steps of:
    assigning a row of a memory array to each device;
    enabling a bit in a first column of the memory array to indicate that the device assigned to the row of the enabled bit is installed and enabled;
    assigning one or more columns of the memory array to indicate sets of routing circuitry;
    enabling bits in said one or more columns to indicate location of each connected device relative to each bus interface circuit; and
    wherein the step of copying portions of the digital map further comprises steps of:
    copying, for each particular bus interface circuit, the column of the memory array with enable bits for each connected device; and
    copying the columns of the memory array indicating the location of each connected device relative to that particular bus interface circuit.

11. The method of claim 2 wherein the steps of preparing the digital map, copying and polling are performed by control routines that are a part of a Basic Input Output System of the computer system.

12. The method of claim 2 wherein the steps of preparing the digital map, copying and polling are performed by control routines which are not a part of the Basic Input Output System of the computer system, but which are accessed by the Basic Input Output System of the computer system.

13. The method of claim 2, wherein the step of polling connected devices is performed during startup and reset of the computer system.

14. The method of claim 3, wherein the step of reading the universal map protocol is performed during startup and reset of the computer system.

15. The method of claim 12, wherein the control routines are accessed by the Basic Input Output System during startup and reset of the computer system.

16. A Basic Input Output System (BIOS) for a computer system having three or more separate buses connected by bus interface circuits, comprising:
a non-volatile digital storage device coupled to the bus structure;
initialization code for initializing elements of the computer system during startup and reset of the computer system;
input/output code for controlling communication with devices connected to the computer system; and
mapping code adapted for preparing a digital master map which portrays the location of each connected device installed on any one of the multiple buses relative to each bus interface circuit, for determining a portion of the master map pertinent to each bus interface circuit according to the buses connected by each interface circuit, and for copying the pertinent portions of the digital master map to the associated bus interface circuits, so that routing requests for connected devices at the bus interface circuits are routed according to the map portions copied to the particular bus interface circuits.

17. A Basic Input Output System as in claim 16 wherein the mapping code sequences are adapted for polling all bus ports on the buses for ascertaining the location of connected devices, and for using the results of the polling operation to prepare the digital map.

18. A Basic Input Output System as in claim 16, further comprising
a plurality of I/O ports wherein each I/O port is assigned a universal configuration port number;
a memory device which stores a universal map protocol which is used for preparing the digital map.

19. A Basic Input Output System as in claim 16 wherein the digital map portions comprise a row assigned to each connected device, an enable bit column indicating connected devices installed and enabled, and one or more routing bit columns indicating the location of each connected device relative to each bus interface circuit.

20. A Basic Input Output System as in claim 16 wherein a bus interface circuit has a first port coupled to a first bus and a second port coupled to a second bus, and the digital map portion copied to the bus interface circuit has one row for each connected device and one routing bit column, wherein a first digital value is stored in the routing bit column in each row assigned to a connected device which is coupled to the second bus and wherein a second digital value, opposite the first digital value, is stored in the routing bit column in each row assigned to a connected device which is coupled to the first bus.

21. A Basic Input Output System as in claim 16 wherein a bus interface circuit has more than two ports connecting more than two buses, and the digital map copied to the bus interface circuit has plural routing bit columns for each connected device of the system.

22. A Basic Input Output System as in claim 18 wherein the memory device is a programmable read-only memory separate from the Basic Input Output System, wherein the programmable read-only memory is accessed by the Basic Input Output System to prepare the digital map.

23. A computer system comprising:
a central processing unit (CPU);
a bus system coupled to said CPU wherein said bus system comprises three or more buses coupled by bus interface circuits;
a plurality of devices coupled to buses of said bus system; and
a Basic Input Output System coupled to said CPU for providing basic operating instructions for said CPU;
wherein said Basic Input Output System is configured for preparing a digital master map during operation of the computer system, wherein the digital master map portrays the location of each connected device relative to each bus interface circuit, for determining a portion of the digital master map pertinent to each bus interface circuit, and for copying the pertinent portions of said digital master map to the associated bus interface circuits, so that routing requests for connected devices at the bus interface circuits are routed according to the map portions copied to the particular bus interface circuits.

24. A computer system as in claim 23 wherein said Basic Input Output System is configured for polling all bus ports on the buses for ascertaining the location of connected devices, and for using the results of the polling operation to prepare said digital map.

25. A computer system as in claim 23; further comprising:
a plurality of I/O ports, wherein each I/O port is assigned a universal configuration port number;
a memory device which stores a universal map protocol which is used for preparing the digital map.

26. A computer system as in claim 23 wherein the digital map portions comprise a row assigned to each connected device, an enable bit column indicating connected devices installed and enabled, and one or more routing bit columns indicating the location of each connected device relative to each set of routing circuitry.

27. A computer system as in claim 25 wherein the memory device is a programmable read-only memory separate from the Basic Input Output System, wherein the programmable read-only memory is accessed by the Basic Input Output System to prepare the digital map.

28. A computer system as in claim 26 wherein a bus interface circuit has a first port coupled to a first bus and a second port coupled to a second bus, and the digital map portion copied to the bus interface circuit has one row for each connected device and one routing bit column, wherein a first digital value is stored in the routing bit column in each row assigned to a connected device which is coupled to the second bus and wherein a second digital value, opposite the first digital value, is stored in the routing bit column in each row assigned to a connected device which is coupled to the first bus.

29. A computer system as in claim 26 wherein a bus interface circuit has more than two ports connecting more than two buses, and the digital map copied to the bus interface circuit has plural routing bit columns for indicating the locations of connected devices relative to the bus interface circuit.

30. A computer system comprising:

a central processing unit (CPU);

a bus system coupled to said CPU comprising three or more buses coupled by bus interface circuits;

a plurality of devices coupled to said buses;

a monitoring unit adapted for monitoring said plurality of buses for identifying the location of each of said plurality of devices relative to each bus interface circuit;

memory coupled to said monitoring unit for storing a digital master map, said digital master map portraying the location of each of said plurality of devices relative to each bus interface circuit; and registers coupled to each of said bus interface circuits, wherein a portion of said digital master map particular to each of said bus interface circuits according to the buses joined by each said interface circuit is copied to the registers coupled to said particular bus interface circuit;

wherein requests for devices by said CPU are routed to said devices according to the portions of said digital master map copied to the registers coupled to each of said bus interface circuits.

31. A computer system comprising:

three buses;

two bus interface circuits connecting the three buses; and a mapper;

wherein the mapper prepares a master map of devices connected to the three buses, the map portraying the location of the devices on the three buses relative to the bus interface circuit, determines a portion of the master map pertinent to each interface circuit according to the buses connected by the interface circuit, and copies the pertinent portion of the map to the associated bus interface circuit.

\* \* \* \* \*